(12) United States Patent
Huber

(10) Patent No.: US 8,650,732 B2
(45) Date of Patent: Feb. 18, 2014

(54) ROAD WHEEL PROTECTION MEMBER

(75) Inventor: Thomas F. Huber, Bloomfield Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 295 days.

(21) Appl. No.: 13/091,404

(22) Filed: Apr. 21, 2011

(65) Prior Publication Data
US 2012/0266454 A1  Oct. 25, 2012

(51) Int. Cl.
*B25B 27/14* (2006.01)
*B62D 43/00* (2006.01)

(52) U.S. Cl.
USPC .................. 29/281.1; 414/463; 224/42.2

(58) Field of Classification Search
USPC .......... 29/700; 224/42.2–42.3; 254/323–327; 414/462–466
See application file for complete search history.

(56) References Cited

U.S. PATENT DOCUMENTS

| | | | | |
|---|---|---|---|---|
| 1,092,463 A | * | 4/1914 | Vaughan | 224/42.3 |
| 1,955,710 A | * | 4/1934 | Lyon | 224/42.2 |
| 3,874,536 A | * | 4/1975 | Watanabe | 414/463 |
| 4,548,540 A | * | 10/1985 | Renfro | 414/463 |
| 4,884,785 A | * | 12/1989 | Denman et al. | 254/389 |
| 5,297,913 A | * | 3/1994 | Au | 414/463 |
| 6,003,922 A | * | 12/1999 | Giesey et al. | 296/37.3 |
| 6,276,889 B1 | * | 8/2001 | Dortch et al. | 414/463 |
| 6,527,252 B2 | * | 3/2003 | Dziedzic | 254/323 |
| 6,991,417 B2 | * | 1/2006 | Reznar | 414/463 |
| 7,487,952 B2 | * | 2/2009 | Murphy | 254/323 |
| 7,770,764 B2 | * | 8/2010 | Rock et al. | 224/42.23 |
| 2004/0265103 A1 | * | 12/2004 | Kiczek et al. | 414/463 |
| 2006/0104768 A1 | * | 5/2006 | Park et al. | 414/463 |
| 2007/0063174 A1 | * | 3/2007 | Sauner et al. | 254/323 |

FOREIGN PATENT DOCUMENTS

DE  19729190 C1 * 11/1998

* cited by examiner

*Primary Examiner* — David Bryant
*Assistant Examiner* — Jacob Cigna
(74) *Attorney, Agent, or Firm* — Frederick A Krieger

(57) ABSTRACT

A protection member for a vehicle road wheel includes a first planar surface and a second planar surface with a central aperture extending therethrough. The protection member further includes a plurality of unequal length pins spaced about the aperture and extending in a direction away from the second surface. The plurality of pins are configured and positioned to engage holes of said road wheel utilized for mounting the road wheel to an axle of the vehicle. The protection member further includes a plurality of spoke receiving features spaced about and extending from the second surface. The spoke receiving features have a complimentary configuration for substantially aligning with a complimentary configuration of spokes of the road wheel. When the road wheel is disposed on the second surface the plurality of pins detachably couple the protection member to the road wheel.

17 Claims, 3 Drawing Sheets

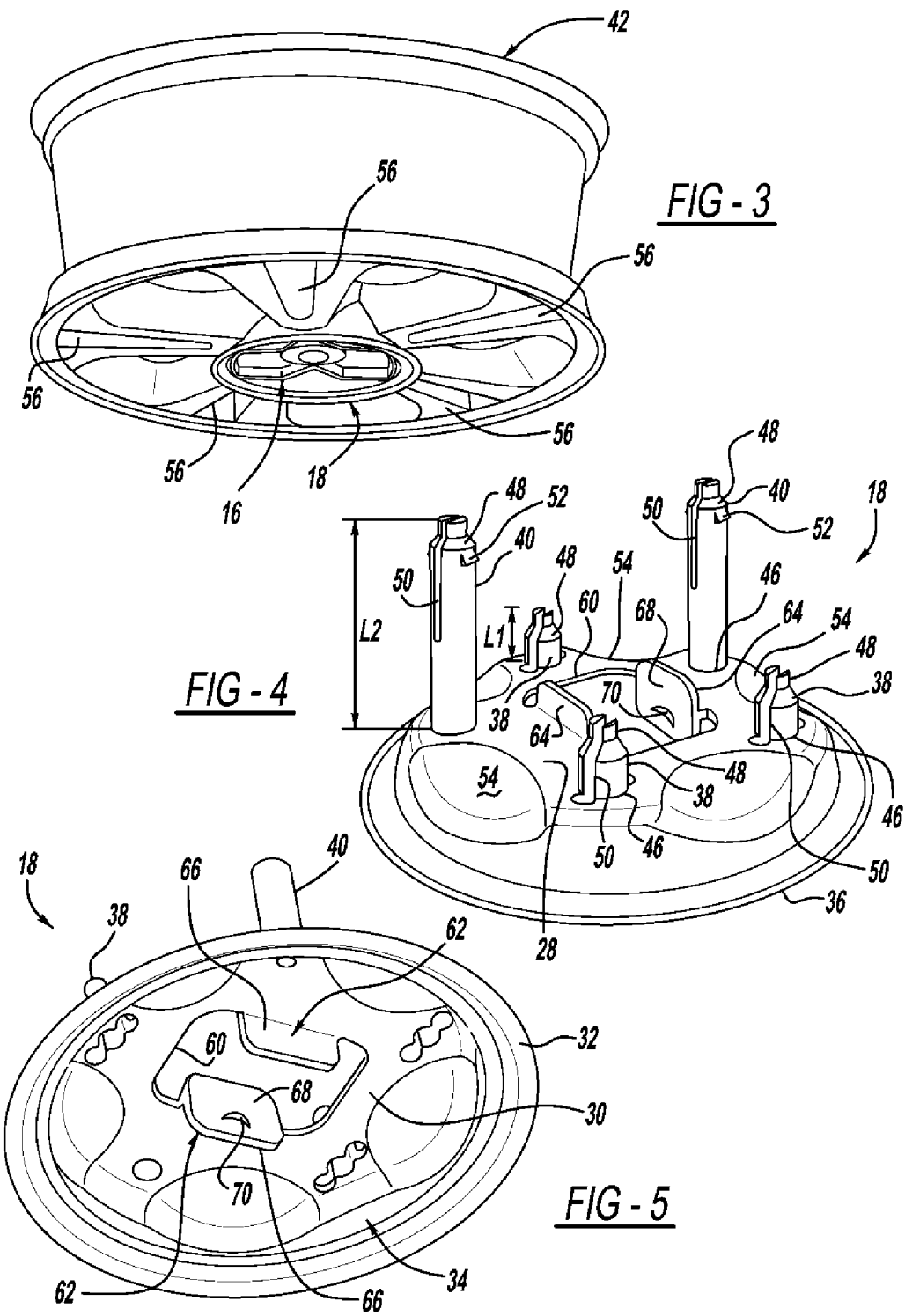

ROAD WHEEL PROTECTION MEMBER

FIELD

The present invention relates to a protective member for a decorative road wheel.

BACKGROUND

Many vehicles include a spare tire mounted to the vehicle. The spare tire is used, for example, to replace a decorative road wheel with a flat tire. Once the spare tire is installed to the vehicle, the flat road wheel may be attached and stored with the vehicle. During the changing of the wheels, the decorative side of the road wheel may contact the ground whereby the exposed or "beauty side" of the road wheel may become scratched or damaged. This is undesirable in that road wheels can be expensive to purchase and expensive to repair.

SUMMARY

A protection member for a vehicle road wheel includes a first planar surface and a second planar surface with a central aperture extending therethrough. The protection member further includes a plurality of unequal length pins spaced about the aperture and extending in a direction away from the second surface. The plurality of pins are configured and positioned to engage holes of said road wheel utilized for mounting the road wheel to an axle of the vehicle. The protection member further includes a plurality of spoke receiving features spaced about and extending from the second surface. The spoke receiving features have a complimentary configuration for substantially aligning with a complimentary configuration of spokes of the road wheel. When the road wheel is disposed on the second surface the plurality of pins detachably couple the protection member to the road wheel.

In another aspect of the protection member, the plurality of unequal length pins includes a first plurality of pins having a first length and a second plurality of pins having a second length, wherein the first length of the first plurality of pins is for coupling the protection member to a side of the road wheel having a plurality of spokes facing outward and the second length of the second plurality of pins is for coupling the protection member to a side of a road wheel without spokes facing outward.

In another aspect of the protection member, each of a plurality of pins includes a movable retention feature.

In another aspect of this disclosure, a protection member assembly for a vehicle road wheel for use with a winch mechanism. The assembly includes a protection member and a wheel lift member. The protection member includes a first planar surface spaced apart from a second planar surface, and a central aperture extending therethrough. The protection member further includes a plurality of pins spaced about the aperture and extending in a direction away from the second surface. The plurality of pins is configured and positioned to engage holes of the road wheel utilized for mounting the road wheel to an axle of the vehicle. The protection member further includes a plurality of spoke receiving features spaced about and extending from the second surface. The spoke receiving features have a complimentary configuration for substantially receiving a complimentary configuration of spokes of the road wheel. When the road wheel is disposed on the second surface the plurality of pins are configured to detachably couple the protection member to the road wheel. The assembly further includes a wheel lift member having a base and an upper portion. The base is configured to be slidably received in the central aperture. The base portion is further configured to abut against a surface of the protection member when the wheel lift member is moved in a direction from the first surface toward the second surface with the upper portion disposed above the second surface. The wheel lift member further includes a telescoping tube positioned along an aperture in the upper portion of the wheel lift member substantially coaxial with the central aperture. The telescoping tube is configured to receive therein a cable for use with the winch mechanism.

In another aspect of the assembly, the central aperture includes surfaces configured to provide support and stability in one direction relative to the assembly. The base portion of the wheel lift member is configured to provide support and stability in another direction relative to the assembly. The central aperture configuration and the base portion configuration are both thereby configured to provide support and stability to maintain the road wheel mounted to the protection member in planar orientation as they are being moved.

Further areas of applicability of the teachings of the present disclosure will become apparent from the detailed description, claims and the drawings provided hereinafter. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a perspective view of a protection member and a collar coupled to a decorative side of road wheel according a principle of the present disclosure;

FIG. 4 is a perspective view of a protection member according a principle of the present disclosure;

FIG. 5 is a perspective bottom view of the protection member of FIG. 4 according a principle of the present disclosure;

DETAILED DESCRIPTION

Disclosed herein are exemplary embodiments of a protection member configured to have a vehicle wheel disposed thereon, wherein the protection member includes unequal length pins for coupling a variety of wheels to the protection member and the protection member further includes portions that cover and/or support decorative portions of a wheel. The unequal length pins of the protection member allows each side of a wheel to be mounted against the protection member, using the mounting holes of the wheel normally utilized for mounting the wheel to an axle of the vehicle. The protection member is further configured so when the protection member rests on the ground, the wheel can be disposed thereon and releasably coupled thereto with the wheel spaced from the ground to protect the wheel from contact with the ground.

Figure 1:
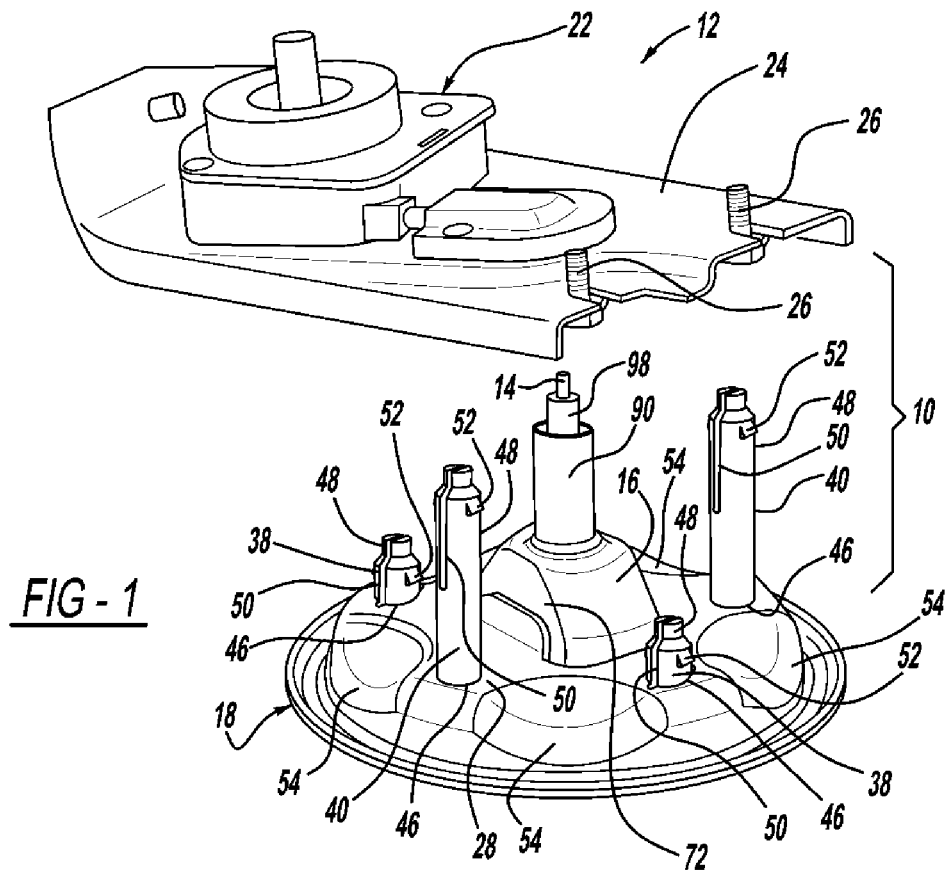
FIG. 1 is a perspective view of a protection member, a collar, and a winch mechanism according a principle of the present disclosure.

In an exemplary embodiment, FIG. 1 illustrates a winch assembly 10 according to the present disclosure. Winch assembly 10 includes a winch mechanism 12 that winds and unwinds a cable 14 coupled to a wheel lift member or collar 16. Collar 16 couples to a protection member 18, which in turn couples to a vehicle road wheel 20 (e.g. FIG. 2). In exemplary embodiments contemplated herein, wheel refers to what is commonly used in the art as a rim, the portion to which a road tire is mounted thereon. In the exemplary embodiments contemplated herein, the protection member 18 can be used with a road tire coupled to the wheel or without a road tire coupled to the wheel.

Winch mechanism 12 includes a winding/unwinding mechanism 22 secured to a connection plate 24 that is coupled via fasteners 26 to a body of a vehicle (not shown). Although not illustrated, winding/unwinding mechanism 22 may be electrically driven by a motor or mechanically driven as is known in the art. While this embodiment illustrates use of the winch assembly to move the protection member and wheel to the vehicle for storage and removal of the wheel, it is contemplated that other means can be utilized to couple the protection member and wheel to the vehicle, wherein the protection member is configured to protect a portion of wheel and/or aid in coupling the wheel to the vehicle when it is desired to store the wheel at a part of the vehicle.

In an exemplary embodiment, protection member 18 is annular shaped having a first surface 28 and a second surface 30. When protection member 18 is coupled with a wheel, first surface 28 faces the wheel while second surface 30 faces away from the wheel. It is contemplated that protection member may be coupled to a decorative road wheel (i.e. coupled to an outboard, decorative side of the wheel), to a spare wheel without decoration, and to inboard and outboard sides of wheels in general with and without a tire affixed to the wheel (rim). Decorative portions of wheels include those wheel configurations, in non-limiting examples, having a plurality of spokes positioned about a central aperture of the wheel, decorative circumferential raised, curved features, and combinations thereof.

Formed proximate a circumference of second surface 30 is a rim portion 32. Radially inboard from rim portion 32 is a recess 34. Although protection member 18 has been described above as an annular member, protection member 18 should not be limited thereto. In this regard, protection member 18 may be any shape desired such as parallelpiped.

Protection member 18 is sized to be about eight inches in diameter. Protection member 18 may be sized, however, as desired. That is, if protection member 18 is to be used in connection with an oversized wheel, protection member 18 may be formed to be larger than eight inches in diameter. Alternatively, if protection member 18 is to be used in connection with a wheel used on a compact or sub-compact vehicle, protection member 18 may be formed to be smaller than eight inches in diameter. Regardless, protection member 18 may be formed to be any size desired by one skilled in the art.

Protection member 18 may be formed of a plastic material such as, for example, polypropylene. Preferably, the polypropylene material is glass-filled with a glass filler content that ranges between 20 percent and 40 percent. Other plastic materials include polystyrene, polyamide, polyethylene, or any other plastic material that may retain rigidity, with a certain degree of flexibility, after molding. Alternatively, protection member 18 may be formed of a metal material such as, for example, aluminum.

Extending from first surface 28 are a plurality of first pins 38 and a plurality of second pins 40, the first and second pins for engaging holes of the wheel utilized for mounting the road wheel to an axle of the vehicle. Because protection member 18 may be secured to either a spare wheel 20 or a road wheel 42, and wheels having different configurations, first pins 38 are provided with a length L1 that is less than a length L2 of second pins 40. In certain exemplary embodiments, first pins 38 are for securing protection member 18 to a spare tire wheel 20 and second pins 40 are for securing protection member 18 to a road wheel 42 (FIG. 3). The length of the second pins are generally longer pins for accommodating the longer distance from the decorative portion of the wheel to where the ends of the pins couple to another member for holding the wheel. The different length pins permit for coupling the protective member to different side configurations of wheels, where, for example, one wheel side may have a shallower depth, compared to the other side of the wheel, before surface 28 abuts a surface of the wheel. In another wheel configuration, a wheel side may include a decorative portion closer to an outer side of the wheel (e.g. as shown in FIG. 3) compared to another wheel configuration where the decorative portion may be separated a greater distance from the holes that receive the pins.

First and second pins 38 and 40 are configured, for example in spacing and number, according the configuration of wheels 20 and 42 (for example, configuration of bolt holes 44 for securing wheel 20 or 42 to a vehicle and protecting certain portions of the wheels when the protection member is coupled to the wheel. In general, a plurality of first pins or second pins are utilized to couple the protection member to the wheel. In certain embodiments, the number of pins extending through mounting holes may equal the number of mounting holes of a particular wheel.

First and second pins 38 and 40 may be generally cylindrically shaped and each include a proximal end 46 connected to protection member 18 and a terminal end 48 distal from protection member 18. Each of first and second pins 38 and 40 include elongated grooves or slots 50 formed therein that allow pins 38 and 40 to deflect inwardly at terminal ends 48 thereof. Slots 50 may be formed along an entire length of pins 38 and 40 as shown by first pins 38, or slots 50 may be formed along only a portion of pins 38 and 40 as shown by second pins 40. Regardless, slots 50 may be formed to any desired length and shape so long as pins 38 and 40 are deflectable at terminal end 48 thereof.

At terminal ends 48 of first and second pins 38 and 40 are retention features 52. Retention features 52 prevent protection member 18 from disengaging from wheel 20 or 42. When protection member 18 is to be removed from spare wheel 20 or road wheel 42, terminal ends 48 of pins 38 and 40 may be squeezed to deflect inward so that retention features 52 may pass through bolt holes 44 in wheels 20 and 42. In other words, retention features 52 are biased toward an outward deployed position. Upon squeezing of terminal ends 48 of pins 38 and 40, retention features 52 are deflected radially inward to separate wheel 20 or 42 from protection member 18. In the illustrated embodiment, retention features 52 are wedge-shaped protrusions. Although retention features 52 are illustrated as being wedge-shaped, it should be understood that retention features 52 may have any shape desired for securely coupling protection member 18 to a road wheel.

Protection member 18 includes a plurality of spoke receiving features 54 extending from surface 28. In the embodiment illustrated, spoke receiving features 54 are lobe-shaped recesses extending from surface 28 that correspond to a number of spokes 56 formed on road wheel 42 and allow a snug fit between protection member 18 and road wheel 42 when protection member 18 is coupled to road wheel 42. In some embodiments, spoke receiving features 54 abut and support spokes 56 or decorative portion for protection and support of the spokes or decorative portion. In other embodiments, the spoke receiving features cover a portion or more of the spokes, yet may not be in contact with a full spoke/decorative surface, for protection of the spokes and/or other decorative portions of the wheel. In some embodiments, the protection member may be configured to include any like number of spoke receiving features that correspond to any number of spokes on the road wheel.

For example, if road wheel 42 includes X spokes, protection member 18 may be designed to have X spoke receiving features 54. In some embodiments, spoke receiving features and a portion of surface 28 may be utilized to cover or support wheel spokes. In some embodiments, the number of spoke receiving features will not equal the number of wheel spokes, although the protection member will still be configured to separate the spokes from the ground when the wheel is coupled to the protection member or protect a decorative portion from undesirable contact when the wheel and protection member are coupled to the vehicle.

Surfaces 28 and 30 include an aperture 60 therethrough at a central portion of protection member 18. As illustrated in FIGS. 4 and 5, aperture 60 is rectangular shaped to correspond to a shape of collar 16. Aperture 60, however, may be any shape desired. In an exemplary embodiment as illustrated in FIGS. 4 and 5, ears 62 extend from a surface of aperture 60 and are planar members that include a first portion 64 that extends outward from first surface 28 and a second portion 66 that extends outward from second surface 30.

First and second portions 64 and 66 of ears 62 define a surface 68 that engages with collar 16. To ensure that ears 62 remain engaged with collar 16, surfaces 68 of ears 62 may include a protrusion 70 that engages an outer surface 72 of collar 16. This ensures that collar 16 remains fixed to protection member 18 when spare wheel 20 or road wheel 42 is mounted to the vehicle. To disengage protrusion 70 from collar 16, second portions 66 of ears 62 are deflectable. Protrusion 70 is illustrated as being eyebrow-shaped, but other shaped protrusions 70 such as round, square, rectangular, and triangular are contemplated, without limitation.

Figure 2:
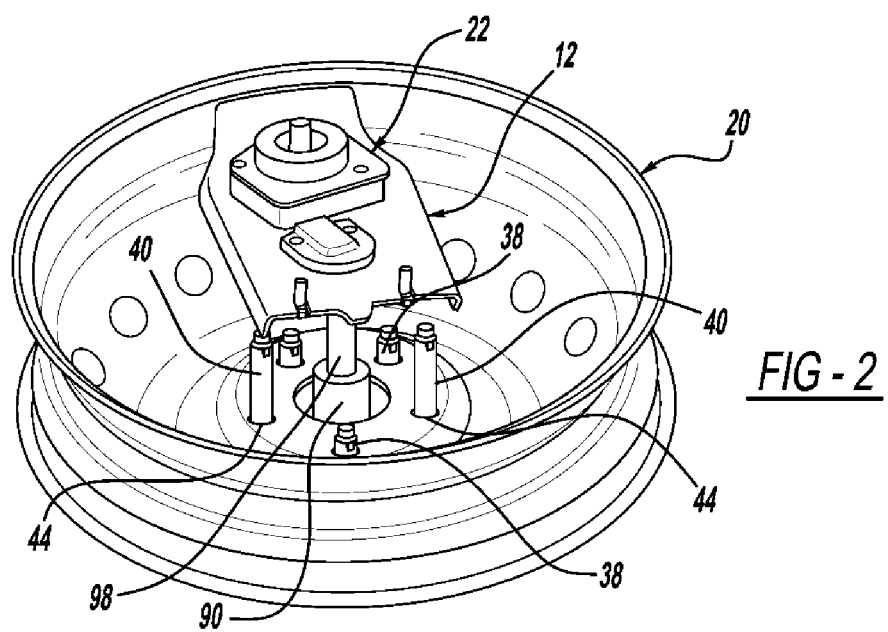
FIG. 2 is a perspective view of a protection member and a collar coupled to a spare wheel, and a winch mechanism according a principle of the present disclosure.

If a flat tire occurs during operation of the vehicle, protection member 18 is designed to be mounted to road wheel 42 (e.g. as shown in FIG. 3 without a tire portion) and protect portions of road wheel 42 from contact with the ground before coupling the wheel 42 to the vehicle using winch mechanism 12. First, spare wheel 20 (e.g. as shown in FIG. 2 without a tire portion) must be removed from storage, for example, from underneath the vehicle. Winch mechanism 12, therefore, is actuated to unwind cable 14 and lower spare wheel 20 to the ground from its stored position underneath the vehicle.

Next, to disengage collar 16 and cable 14 from protection member 18, second portions 66 of ears 62 are deflected away from aperture 60 to disengage protrusions 70 from collar 16. Once protrusions 70 are disengaged from collar 16, the collar may be rotated or otherwise moved out of aperture 60.

Then, protection member 18 is removed from spare wheel 20. To remove protection member 18 from spare wheel 20, terminal ends 48 of pins 38 and 40 are squeezed to deflect inward. Once terminal ends 48 of pins 38 and 40 are squeezed, wedge-shaped projections 52 are allowed to pass through bolt holes 44 to separate protection member 18 from spare wheel 20.

Upon removing road wheel 42 from the vehicle for replacement with the spare wheel 20, protection member 18 is engaged with road wheel 42, wherein a surface of the decorative side of the wheel 42 is disposed on surface 28 of the protection member 18. As noted in the embodiment above, protection member 18 includes spoke receiving features 54 that correspond to a number of spokes 56 formed on road wheel 42. Spoke receiving features 54, therefore, should be aligned with respective spokes 56 of road wheel 42. Pins 38 and 40 may then be inserted through bolt holes of road wheel 42 until wedge-shaped projections 52 engage with road wheel 42 to couple protection member 18 thereto.

As the rim portion 32 of the protection member 18 rests on the ground and a surface of wheel 42 abuts surface 28 of the protection member, the wheel is spaced apart from the ground because the rim portion (here, first planar surface of the protection member) is spaced apart from surface 28 (here, second planar surface of the protection member), so the wheel does not contact the ground.

Collar 16 may be coupled with the protection member 18 and the wheel by inserting the collar and cable 14 thorough aperture 60 until the collar snaps into engagement with protrusions 70 formed on ears 62. After collar 16 is secured to protection member 18, road wheel 42 may be moved along the ground to a position underneath the vehicle. Due to protection member 18, a surface of road wheel 18 bearing spokes 56 is precluded from contact with the ground. This protects the road wheel 42 from damage and/or scratching while moving the protection member with the wheel coupled thereto along the ground, thereby maintaining the ornamental appearance of road wheel 42. Once road wheel 42 is positioned beneath the vehicle, winch mechanism 12 may be actuated to wind cable 14 and raise road wheel 42 and the protection member 18 to a stored position beneath the vehicle.

Figure 6:
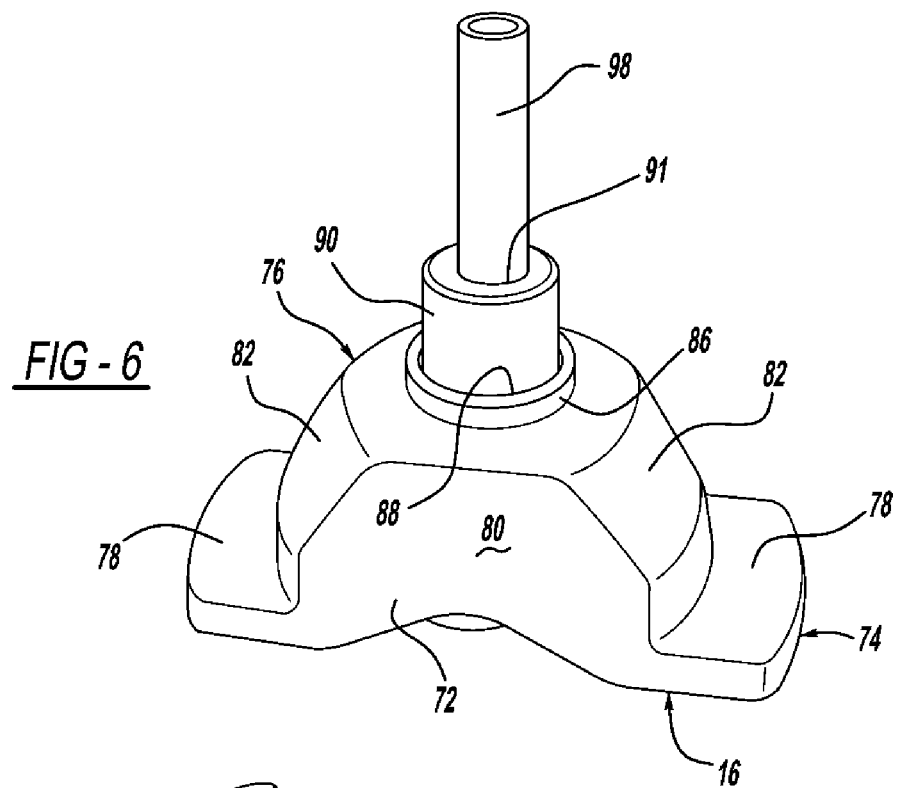
FIG. 6 is a perspective view of a wheel lift member or collar according a principle of the present disclosure.
Figure 7:
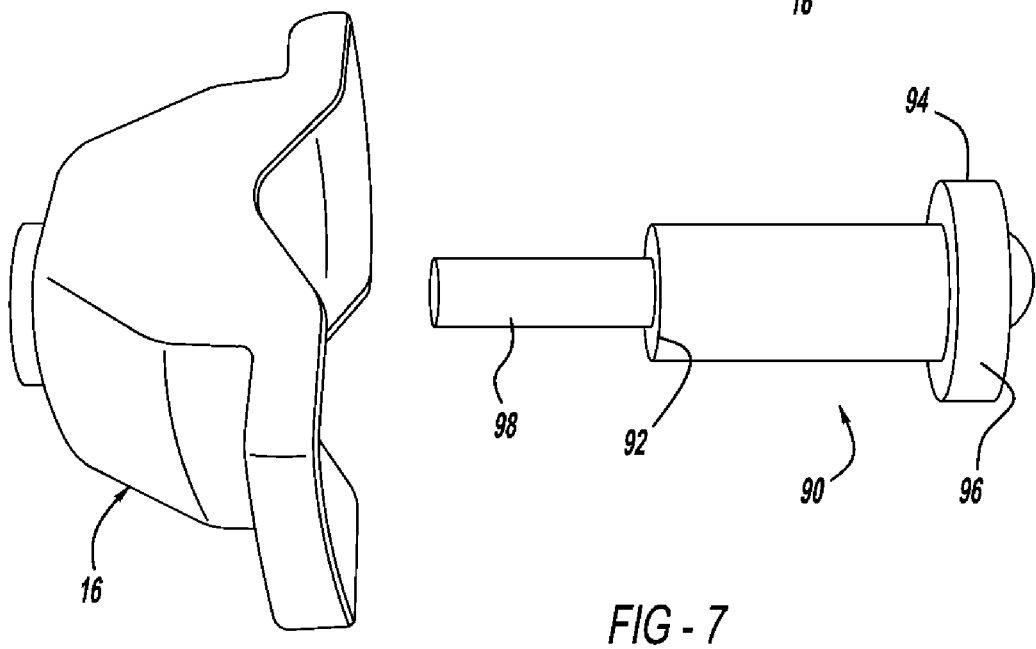
FIG. 7 is an exploded perspective view of the wheel lift member or collar illustrated in FIG. 6.

In an exemplary embodiment and referring to FIGS. 6 and 7, collar 16 includes a base portion 74 and an upper portion 76. Upper portion 76 is configured to fit within aperture 60 of protection member 18, while base portion 74 is designed to abut second surface 30 of protection member 18 when collar 16 is inserted into aperture 60 during lifting and lowering of wheel 20 and protection member 18 with winch mechanism 12. In this regard, outer surface 72 of base portion 74 defines an abutment surface 78 at least a portion of which abuts second surface 30 when lifting and lowering wheel 20 or 42 using winch mechanism 12. This portion, abutment surfaces 78, of the collar 16 provides support and stability when moving, e.g. lifting, the protection member 18 with the wheel.

Upper portion 76 includes engagement surfaces 80, wherein a portion of surfaces 80 engage with protrusions 70 formed on ears 62 of protection member 18. Here, engagement surfaces 80 are generally planar surfaces that correspond to surfaces 68 of ears 62. When collar 16 is coupled to protection member 18, the corresponding arrangement between engagement surfaces 80 and major surfaces 80 provides stability between collar 16 and protection member 18 during raising and lowering of wheel 20 or 42 with winch mechanism 12.

In exemplary embodiments such as the embodiment just described, the base of the collar includes a portion configured to provide stiffness in one direction of the protection member and wheel lift member assembly. A surface of the central aperture of the protection member is configured to provide stiffness in another direction of the protection member and wheel lift member assembly. Here the aperture is rectangular shaped and spaced deflectable (e.g. ears) surfaces extend from the aperture and are orientated to operate with the base so as to support and maintain the road wheel coupled to the protection member in a planar orientation relative to the ground as the wheel and protection member are moved to or from a stowed position, for example via the winch mechanism.

Connecting engagement surfaces 80 are a pair of curved or angled surfaces 82. Angled surfaces 82 taper in a direction away from edges 84 of base portion 74. Such an arrangement assists in inserting and removing collar 16 from aperture 60.

An upper surface 86 of upper portion 76 defines an axially extending cylindrical portion 86. An inner surface of cylindrical portion 86 defines a through hole 88. Disposed within cylindrical portion 86 and through hole 88 is a removable plug or sleeve 90.

Sleeve 90 includes a first end 92 that is dimensioned to pass through hole 88. At an opposite second end 94 is a bulbous portion 96. Sleeve 90 defines an aperture 91 so as to allow cable 14 to pass therethrough. Bulbous portion 96 may be disc-shaped or any shape desired. Bulbous portion 96 being formed at second end 94 of sleeve 90 allows sleeve 90 to be removable from collar 16 when sleeve 90 is pulled away from through hole 88, and prevent sleeve 90 from exiting collar 16 when bulbous portion 96 engages an inner surface of the upper portion 76 (not shown) disposed opposite upper surface 86 of collar 16.

Collar 16 and sleeve 90 are preferably each formed of a material such as steel in order to provide rigidity and strength thereto. Alternatively, collar 16 and sleeve 90 may each be formed of materials such as aluminum, titanium, iron, or other metal materials known in the art. Although collar 16 and sleeve 90 are preferably each formed of the same materials, it is contemplated that collar 16 and sleeve 90 may be formed of different materials. Other materials contemplated for forming collar 16 and sleeve 90 include plastic materials and glass-reinforced plastic materials that may be used to form protection member 18.

Disposed within sleeve 90 may be a telescoping tube 98. Telescoping tube 98 allows cable 14 to pass therethrough into sleeve 90 where an end of cable 14 is fixed to a portion of sleeve 90 proximate bulbous portion 96 to prevent cable 14 from detaching from collar 16. In exemplary embodiments, the central aperture of the protection member and the collar are configured so the collar, including the cable, can be separated from the protection member and one wheel and coupled to another wheel. For instance in the embodiment shown in FIG. 1, the collar 16 is moved in a downward direction from surface 28 toward rim portion 32 until the telescoping tube 98 is below the aperture 60. Then the base portion of the collar is rotated so base portion 74 can be moved upward through aperture 60 and the remainder of the collar is rotated and moved through the aperture 60 until the collar and cable 14 clear the aperture at surface 28 so the collar and cable are separated from the protection member and wheel if coupled to the protective member.

Sleeve 90 and telescoping tube 98 function so cable 14 bends at a desirable point above the center of gravity of the combined wheel 20 or 42 and protection member 18. Although sleeve 90 is capable of performing this function alone, the use of telescoping tube 98 further raises the point at which cable 14 bends relative to wheel 20 or 42 and protection member 18. By raising the bend point of the cable 14 with sleeve 90 alone, or in combination with telescoping tube 98, increased stability is achieved between collar 16 and the combined protection member 18 and wheel 20 or 42 in that bending loads from the cable are not transferred to the wheel and protection member to tilt them while moving or lifting them.

That is, when the combined protection member 18 and wheel 20 are placed or 42 is being raised by winch assembly 10, cable 14 will bend due to slack in cable 14. By increasing the distance where cable 14 may bend relative to collar 16, engagement between collar 16 and protection member 18 is supported and maintained in a planar manner as winch assembly 10 lifts wheel 20 or 42 and protection member 18 into a stowed position beneath the vehicle. Once wheel 20 or 42 is fully lifted by winch assembly 10, telescoping tube 98 may be pushed into aperture 91 defined by sleeve 90, which allows wheel 20 or 42 to fully seat against the body (not shown) of the vehicle.

What is claimed is:

1. A protection member for a vehicle road wheel, comprising:
   a first planar surface spaced apart from a second planar surface, and a central aperture extending therethrough;
   a plurality of unequal length pins spaced about the aperture and extending in a direction away from the second surface, the plurality of pins configured and positioned to engage holes of said road wheel utilized for mounting the road wheel to an axle of the vehicle; and
   a plurality of spoke receiving features spaced about and extending from the second surface, the spoke receiving features having a complimentary configuration for substantially aligning with a complimentary configuration of spokes of the road wheel, wherein when the road wheel is disposed on the second surface the plurality of pins detachably couple the protection member to the road wheel,
   wherein each of the plurality of pins includes a retention feature positioned at a deformable portion of the pin, and an elongated slot in an end portion of the pin.

2. The protection member of claim 1, wherein each of the plurality of pins includes a movable retention feature.

3. The protection member of claim 1, wherein the retention feature is a protrusion.

4. The protection member of claim 1, wherein each of the plurality of spoke receiving features includes a shaped recess area.

5. The protection member of claim 1, wherein the protection member is made of a plastic material.

6. The protection member of claim 1, wherein the central aperture includes a pair of spaced deflectable ears each having a protrusion.

7. The protection member of claim 1, wherein the plurality of unequal length pins includes a first plurality of pins having a first length and a second plurality of pins having a second length.

8. The protection member of claim 7, wherein the first length is substantially longer than the second length.

9. The protection member of claim 7, wherein the first length of the first plurality of pins is for coupling the protection member to a side of the road wheel having the plurality of spokes facing outward and the second length of the second plurality of pins is for coupling the protection member to a side of a road wheel without spokes facing outward.

10. A protection member assembly for a vehicle road wheel for use with a winch assembly, comprising:
    a first planar surface spaced apart from a second planar surface, and a central aperture extending therethrough;
    a plurality of pins spaced about the aperture and extending in a direction away from the second surface, the plurality of pins configured and positioned to engage holes of the road wheel utilized for mounting the road wheel to an axle of the vehicle;
    a plurality of spoke receiving features spaced about and extending from the second surface, the spoke receiving features having a complimentary configuration for substantially receiving a complimentary configuration of spokes of the road wheel, wherein when the road wheel is disposed on the second surface the plurality of pins are configured to detachably couple the protection member to the road wheel;

a wheel lift member having a base and an upper portion, the base configured to be slidably received in the central aperture, the base further configured to abut against a surface of the protection member when the wheel lift member is moved in a direction from the first surface toward the second surface with the upper portion disposed above the second surface; and a telescoping tube positioned along an aperture in the upper portion of the wheel lift member substantially coaxial with the central aperture, the telescoping tube configured to receive therein a cable from the winch assembly, wherein the surface of the central aperture includes a pair of spaced deflectable ears each having a protrusion configured to engage the base.

11. The protection member assembly of claim 10, wherein the base has a rectangular configuration.

12. The protection member assembly of claim 10, wherein the wheel lift member further includes a plug positioned at the upper portion, the plug having an aperture configured for receiving the telescoping tube.

13. The protection member assembly of claim 10, wherein an end of the telescoping tube is positioned above a center of gravity of the road wheel when the road wheel is disposed on the second surface.

14. The protection member assembly of claim 10, wherein the wheel lift member is made of a material different than the first and second surfaces.

15. The protection member assembly of claim 10, wherein a portion of the base is configured to provide stiffness in one direction of the protection member and wheel lift member assembly, and a central aperture surface of the protection member is configured to provide stiffness in another direction of the protection member and wheel lift member assembly, wherein the protection member and wheel lift member assembly is configured to support and maintain the road wheel in a planar orientation relative to the ground as the wheel and protection member are moved to or from a stored position via the winch assembly.

16. The protection member assembly of claim 10, wherein the base and a surface defining the central aperture have a deflectable interference fit relationship when the base is slidably received in the central aperture.

17. The protection member assembly of claim 16, wherein the surface of the central aperture includes a protrusion configured to engage said base.

\* \* \* \* \*